(12) United States Patent  
Lach

(10) Patent No.: US 6,363,452 B1
(45) Date of Patent: Mar. 26, 2002

(54) METHOD AND APPARATUS FOR ADDING AND REMOVING COMPONENTS WITHOUT POWERING DOWN COMPUTER SYSTEM

(75) Inventor: Jorge E. Lach, Lexington, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/280,784

(22) Filed: Mar. 29, 1999

(51) Int. Cl.[7] .......................... G06F 13/00; G06F 13/20
(52) U.S. Cl. ........................ 710/316; 710/313; 710/302
(58) Field of Search ................................. 710/101, 102, 710/103, 300, 301, 302, 303, 304, 313, 315, 316

(56) References Cited

U.S. PATENT DOCUMENTS

| | | | | |
|---|---|---|---|---|
| 5,781,747 A | * | 7/1998 | Smith et al. ................. | 395/309 |
| 5,815,647 A | * | 9/1998 | Buckland et al. ....... | 395/182.01 |
| 5,875,308 A | * | 2/1999 | Egan et al. .................. | 395/283 |
| 5,938,751 A | * | 8/1999 | Tavallaei et al. ............ | 710/103 |
| 6,138,192 A | * | 10/2000 | Hausauer .................... | 710/100 |
| 6,145,044 A | * | 11/2000 | Ogura ......................... | 710/126 |
| 6,170,029 B1 | * | 1/2001 | Kelley et al. ................ | 710/103 |
| 6,185,642 B1 | * | 2/2001 | Beukema et al. ............. | 710/60 |

\* cited by examiner

*Primary Examiner*—Robert Beausoleil
*Assistant Examiner*—Tim Vo
(74) *Attorney, Agent, or Firm*—Kudirka & Jobse, LLP

(57) ABSTRACT

A hot plugging system has a first mechanism for selectively connecting, responsive to a first control signal, each of a plurality of slots with a primary bus, e.g.,a PCI bus connected to a system bus of a computer system; and a second mechanism for connecting, responsive to a second control signal, at least one of the slots with a secondary bus, e.g., a dedicated PCI bus, or other connection interface, used for testing purposes during hot-plug insertion of an adapter card. In another aspect, a hot plug controller makes the connection of the at least one slot to the primary bus in response to a BUS_IDLE signal from the host bridge that indicates when the PCI bus is idle. The BUS_IDLE signal can be generated from the FRAME and IRDY signals for the primary bus by combinational logic in the host bridge. In this way, the hot plug controller need not be connected to and load the shared lines, e.g., the FRAME and IRDY lines, of that bus.

18 Claims, 12 Drawing Sheets

METHOD AND APPARATUS FOR ADDING AND REMOVING COMPONENTS WITHOUT POWERING DOWN COMPUTER SYSTEM

FIELD OF THE INVENTION

This invention generally relates to computer systems such as personal computers, workstations and servers, and more particularly to computer systems that permit the addition or removal of components without powering down.

BACKGROUND OF THE INVENTION

Computer servers have become essential in business environments, providing mission-critical applications, such as business databases, e-mail, and company-wide local area networks. Loss of access to such applications for even short periods of time can have enormous impact on business operations. To achieve high availability, system providers often take special measures such as incorporating component redundancy, e.g., redundant power supplies, redundant network interface cards (NICs), or redundant arrays of independent disks (RAID) storage systems.

Significant attention has recently been focused on providing high availability for the Input/Output (I/O) subsystem of computer servers. The PCI local bus (or simply, the "PCI bus") is widely used for I/O subsystems. The PCI bus is an industry-standard bus for connecting peripherals and other components in accordance with the PCI Local Bus Specifications, Revision 2.1, Jun. 1, 1995, (the "PCI Spec"), which is available from the PCI Special Interest Group, Portland, Oreg., USA, and incorporated herein by reference.

Over time, peripherals may have to be repaired or upgraded with additional functionality. Historically, this often required the computer server to be powered down while the repair or upgrade was effected. The PCI Spec in its basic form did not provide for components to be connected to the PCI bus while the computer server is powered up. Such hot-plug capability was added to PCI buses conforming to the PCI Hot-Plug Specification, Revision 1.0, Oct. 6, 1997 (the "PCI Hot-Plug Spec"), which is available from the PCI Special Interest Group, Portland, Oreg., USA, and incorporated herein by reference.

Accordingly, the PCI Hot-Plug Spec is an enhancement to the PCI Spec that allows adapter cards to be inserted into or removed from PCI bus slots at any time, even while the system is powered on, so as to provide high system availability and serviceability. An adapter card is typically a circuit board that includes chips and other electronic components electrically interconnected to add functions or resources to a computer server or other computer system into which it is installed. PCI adapter cards are designed in accordance with the PCI Spec to be plugged into a PCI-compliant slot of a PCI bus. Adapter cards can take the form of expansion cards that, for example, add memory, disk-drive controllers, video support, parallel and serial ports, internal modems, and/or network interfaces ("NICs").

Generally speaking, hot-plugging is a process of inserting or removing an adapter card from a computer server or other computer system without stopping software running on the system or powering down the system as a whole, though running of certain software may be stopped, or certain hardware powered down. To achieve hot-plugging, the I/O subsystem of a server or other computer system is provided with a hot plug controller for controlling hot plugging operations, and devices (e.g., electronic switches) for isolating slots from bus signals by selectively decoupling the slots from the PCI bus during card insertion and removal.

Typically, hot plug administrative software is provided as well for coordinating hot-plugging activities and interfacing with the server's operating system (O/S), and, through a graphical user interface (gui), with a technician at a console. Each adapter card typically has an adapter driver, and the hot-plug controller has a hot plug system driver that interfaces through the server's operating system with the hot plug administrative software.

While computer systems equipped with PCI buses having hot-plugging capability are generally suitable for their intended purposes, it would be desired to improve their capability so as to overcome certain drawbacks. For example, following hot plug insertion, malfunctioning of a newly inserted adapter card can cause serious problems, such as lost or corrupted data or hanging of the bus protocol so as to prevent completion of a bus transaction. For example, if an adapter card's connection were to break at a PCI control signal, such as FRAME#, the card might not respond when addressed by the server's CPU, and critical data may be lost. In extreme cases, malfunction of the newly installed adapter card can cause a system crash. It may even prevent the system from booting up again. Needless to say, such problems can interfere with diagnosis and repair of the problem adapter card. While this is true of servers regardless of whether they are hot plugging capable, in servers equipped with hot plug capability, this drawback undermines the advantages of high availability and serviceability otherwise attainable by hot plug technology.

Moreover, existing systems can have problems when a newly inserted adapter card comes on-line, i.e., is electrically connected to (and no longer isolated from) the PCI bus for bus signaling purposes. The problems in this instance are associated with the sudden change in the electrical characteristics of the bus, which can result in "glitches" (i.e., electrical anomalies) on the bus. These can potentially cause the newly inserted adapter card (or another device then on the bus) to misinterpret the bus signal levels and operate erroneously. This problem is exacerbated by increased loading of devices on the bus, as occurs with the addition of a hot plug controller and adapter cards. Signals on the bus tend to degrade as they propagate from device to device on the bus; with additional devices on the bus, the signals degrade that much more. Such glitches and signal degradation may not present a significant problem, however, if the PCI bus is allowed to run at a slow enough speed for adequate signal capture under existing load conditions. For this reason, PCI buses equipped for hot plugging are generally operated today at a nominal speed of 33 MHz (i.e., in a range up to 33⅓ MHz), as defined in the PCI Spec. However, PCI buses are allowed to operate also at the higher nominal speed of 66 MHz (i.e., in a range between 33⅓ MHz and 66⅔ MHz), as defined in the PCI Spec. It would be desirable to run PCI buses equipped with hot plugging capability at the higher speed.

SUMMARY OF THE INVENTION

The invention resides in a hot plugging system having a first mechanism for selectively connecting, responsive to a first control signal, each of a plurality of slots with a primary bus, e.g., a PCI bus connected to a system bus of a computer system; and a second mechanism for connecting, responsive to a second control signal, at least one of the slots with a secondary bus, e.g., a dedicated PCI bus, or other connection interface, used for testing purposes during hot-plug insertion of an adapter card received in the at least one slot. The system can also have a controller for applying the first and second control signals to the slots so as to switch the connection of the at least one slot to the primary bus from the secondary bus after testing validates operation of the adapter card(s).

In accordance with another aspect of the invention, the hot plug controller makes the connection of the at least one slot to the primary bus in response to a BUS_IDLE signal from the host bridge that indicates when the PCI bus is idle. The BUS_IDLE signal can be generated from the FRAME and IRDY signals for the primary bus by combinational logic in the host bridge. In this way, the hot plug controller need not be connected to and load the shared lines, e.g., the FRAME and IRDY lines, of that bus. Accordingly, the primary bus may be operated, depending on conditions, at the higher permitted speeds. The hot plug controller according to this aspect of the invention is connected to the host bridge by a pair of REQUEST and GRANT lines so as to be able to gain control of the primary PCI bus, and by a BUS_IDLE signal line to indicate when the hot plug controller can connect newly inserted adapter cards to the primary bus and thereby bring them on line for normal operation of the computer system.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
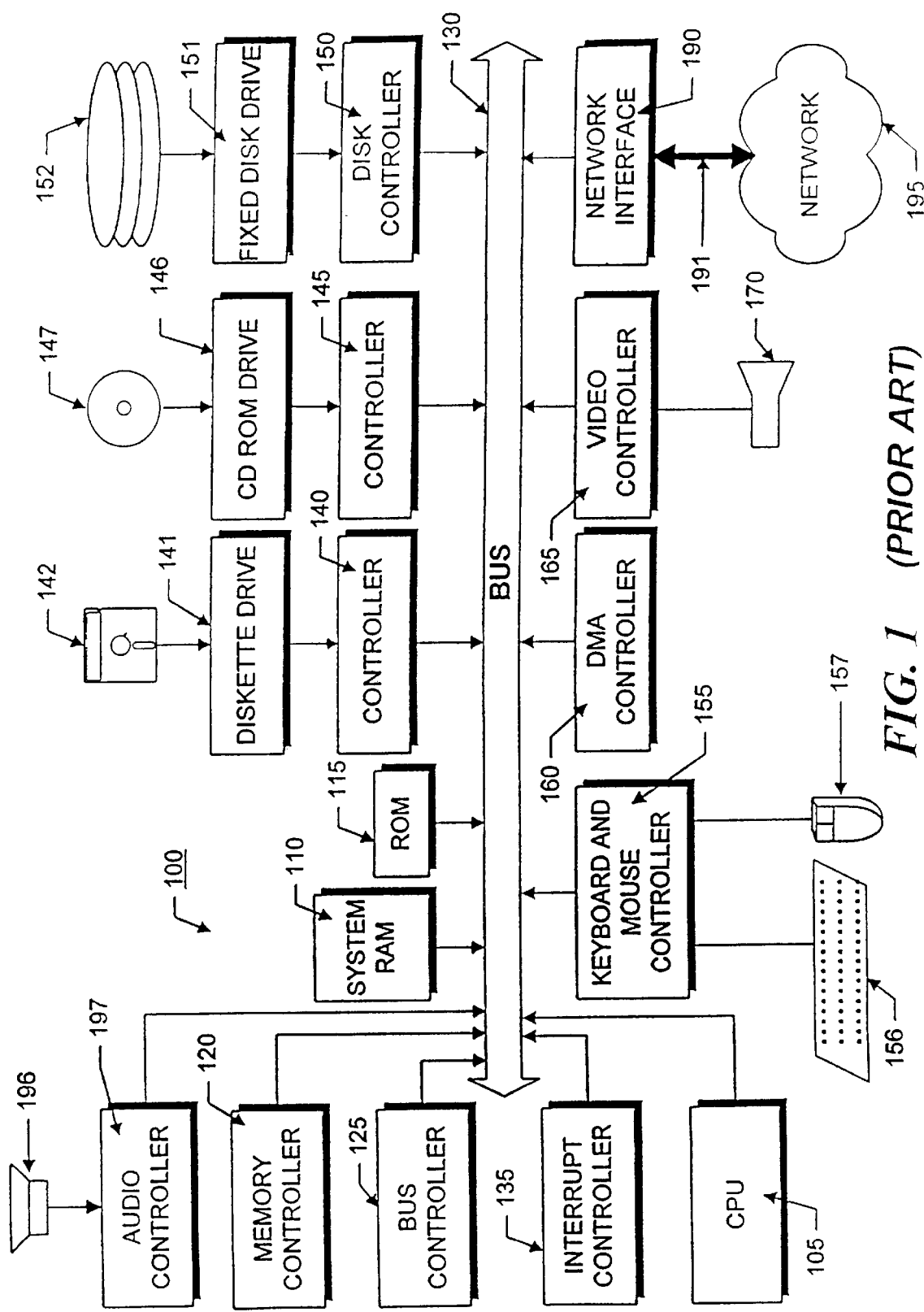
FIG. 1 is a block diagram of an illustrative architecture of a computer system in accordance with the prior art.

FIG. 1 illustrates a conventional system architecture for an exemplary computer system 100 with which the disclosed invention can be implemented. The computer system of FIG. 1 is discussed only for descriptive purposes, and its specific layout and design should not be considered a limitation of the invention. Although the description below may refer to terms commonly used in describing particular computer systems, the described concepts apply equally to other computer systems, including systems having architectures that are dissimilar to that shown in FIG. 1.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with computer system 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to and output from the computer system 100 may be provided by a number of devices collectively constituting an I/O subsystem. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to computer system 100 through bus 130 and an appropriate controller. DMA controller 160 is provided for performing direct memory access to system RAM 110. A visual display is generated by a video controller 165, which controls video display 170. Where the computer system 100 is a server, the foregoing I/O devices may be part of the system only when needed for system monitoring, upgrading or servicing.

Computer system 100 also includes a network adapter 190 that allows the computer system 100 to be interconnected to a network 195 via a bus 191. The network 195, which may be a local area network (LAN), a wide area network (WAN), or the Internet, may utilize general-purpose communication lines that interconnect multiple network devices.

Computer system 100 generally is controlled and coordinated by operating system software, such as the SOLARIS operating system (available from Sun Microsystems, Palo Alto, Calif., USA). Among other computer system control functions, the operating system controls allocation of system resources and performs tasks such as process scheduling, memory management, networking and I/O services.

Figure 2:
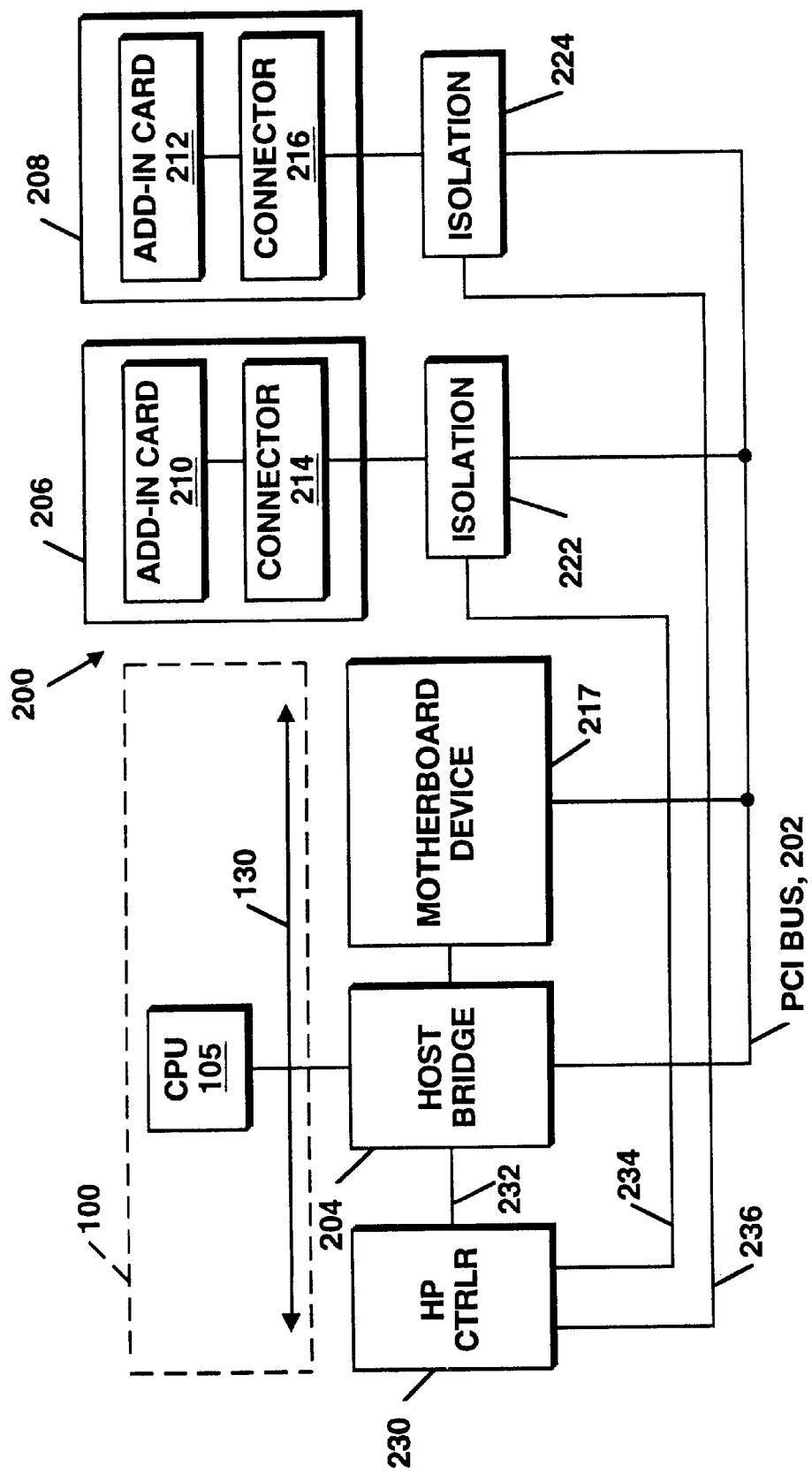
FIG. 2 is a block diagram of a conventional hot plug arrangement for the computer system of FIG. 1.

FIG. 2 shows the computer system 100 enhanced with a PCI bus 202 with hot plug capability in a conventional arrangement 200 that permits electrical and logical connection of a number of peripheral devices to the system bus 130 and thus to the CPU 105 and other components connected thereto. While buses are shown in the figures as single lines for convenience sake, it will be appreciated that they actually contain multiple lines, as will be further elaborated below.

A host bridge 204 interconnects the system bus 130 and the PCI bus 202 for communication therebetween, originating from one of the devices ("initiator" or "initiator node")

on one of the buses and intended for a destination ("target" or "target node") on the other of the buses. More particularly, the host bridge 204 is a node having a unique address for communication purposes on both the system bus 130 and the PCI bus 202. The host bridge 204 (a) identifies signals from devices on one of the system and PCI buses 130, 202 intended for a device on the other of the buses 202,130; (b) translates or otherwise modifies the signals, as needed, to those having electrical, physical, and formatting characteristics suitable for the other of the buses 202, 130 (including the appropriate address of the target); and (c) obtains control of the other of the buses 202, 130 for forwarding the modified signals to the destination device.

The PCI bus 202 has a number of slots, e.g., slots 206, 208 for receiving and electrically connecting adapter cards, e.g., cards 210, 212 via connectors 214, 216. The adapter cards 210, 212 typically contain functionality in addition to that found on the motherboard of the computer system 100; though, motherboard devices 217 (i.e., devices disposed on the motherboard) can be connected to the PCI bus 202 in addition to off-motherboard devices (e.g., adapter cards in slots 206, 208).

The adapter cards 210, 212 can contain any sort of computer functionality, such as a memory or a peripheral device. Each slot 206, 208 can be isolated from the PCI bus 202 for adapter card insertion and removal by isolation devices 222, 224, typically an electronic switch for each line of the bus. The isolation devices 222, 224 can be implemented, for example, as transfer gates, e.g., field effect transistors (FET) switches or crossbar switches, placed between the PCI bus signal lines and the PCI connector of the slots.

A hot plug controller 230 is connected by only certain lines 232 to the host bridge 204 for gaining control of the PCI bus 202 during hot plug insertion and removal. Specifically, the hot plug controller 230 is connected to the host bridge 204 by PCI bus lines, including FRAME# and IRDY# (as described below), that are shared with other devices that are nodes on the PCI bus. With this arrangement, the hot plug controller 230 represents an extra load on those shared lines, which can potentially limit operating speed, as discussed in the "Background of the Invention" section, above. (An alternative to the illustrated arrangement in this regard has the hot plug controller connected to all the PCI bus lines as a node on the PCI bus, again undesirably loading the shared lines.) Continuing on with the description of FIG. 2, the hot plug controller 230 is connected by control lines 234, 236 to control terminals of the isolation switches 222, 224 to cause the switches to connect and disconnect selectively the individual slots from the bus lines during hot plug insertion and removal.

Figure 3:
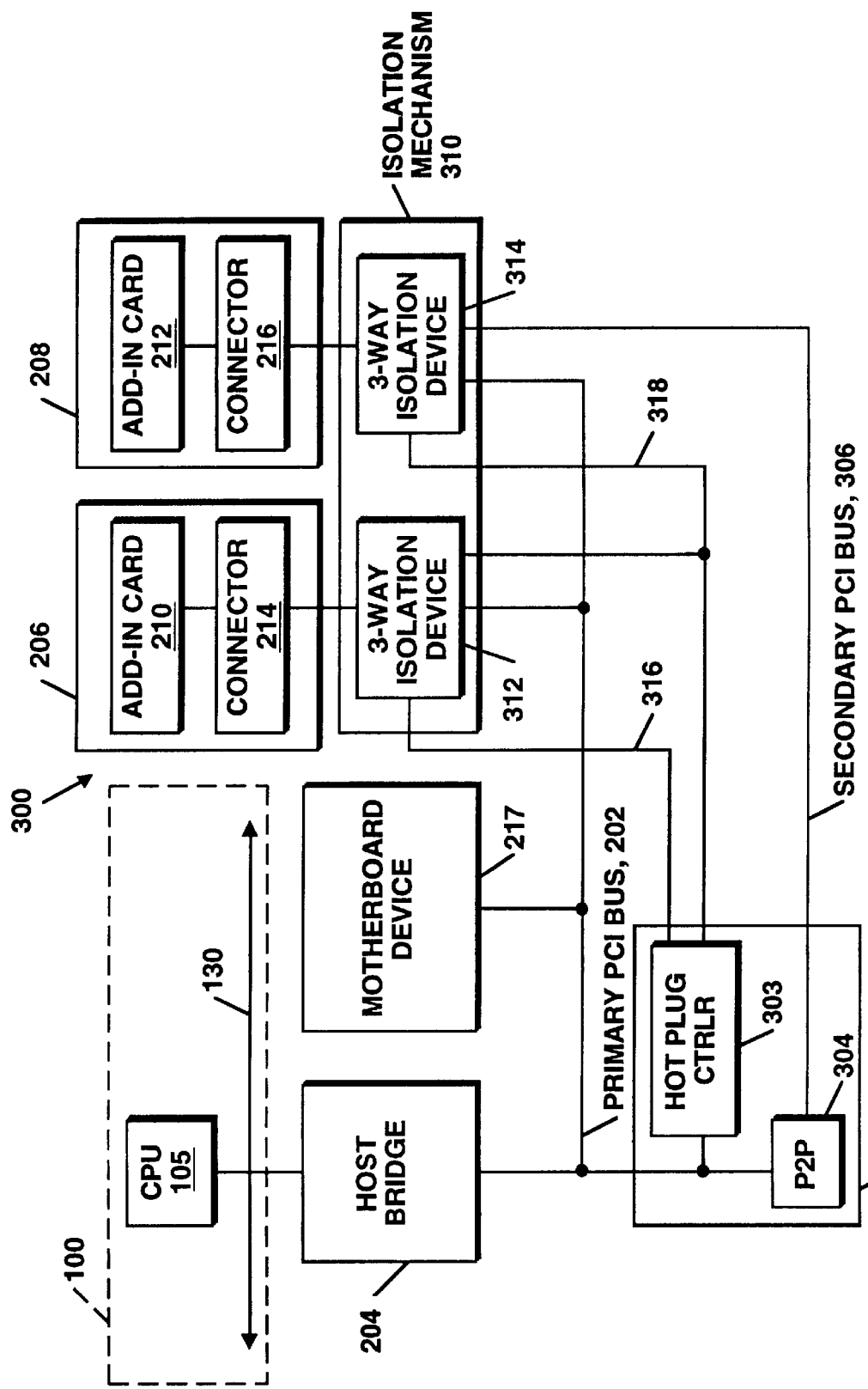
FIG. 3 is a block diagram of an improved hot plug arrangement for the computer system of FIG. 1 in accordance with an embodiment of the invention.

FIG. 3 show as an improved hot plug arrangement 300 in accordance with an embodiment of the invention, in which newly inserted adapter cards can be tested prior to connection to the primary PCI bus 202. The hot plug arrangement 300 has a hot plug logic module 302 that includes both a hot plug controller 302, and a secondary bridge 304, e.g., a PCI-to-PCI bridge ("P2P") 304 connected between the primary PCI bus and a secondary bus 306, e.g., a PCI bus. Moreover, the hot plug arrangement 300 has three-way isolation switches 312, 314, described below, for separately connecting (and disconnecting) the individual slots 206, 208 to (from) the primary PCI bus 202 and to (from) the secondary local PCI bus 306. The switches 312, 314 are controlled by control signals applied over control lines 316, 318 by the hot plug controller 303. Thus, the hot plug arrangement 300 can connect a slot containing a newly inserted adapter card to the secondary bus 306 for testing purposes to confirm operation of the card within normal parameters before it connects the card to the primary bus 202.

Unlike the conventional arrangement 200 of FIG. 2, communications between the host bridge 204 and either the hot plug controller 303 or the individual slots 206, 208 is achieved directly via the primary PCI bus for normal operation and through the secondary PCI bus for testing. More specifically, for testing of individual slots, communication between the host bridge 204 (and thus, e.g., CPU 105) and individual slots 206, 208 is achieved through the P2P 304 and the secondary PCI bus 306 on an individual slot basis (i.e., one slot at a time) via the secondary PCI bus 306. The arrangement 300 preferably permits communication between the host bridge 204 and the slots 206, 208 via only one of the primary and secondary buses 202, 306 at any given time. Under these controlled conditions, the CPU 105 can probe an adapter card 206, 208 through the PCI-to-PCI ("P2P") bridge 304 to determine that it is fully functional before the arrangement 300 places the adapter card on line by enabling communication over the primary PCI bus 202.

Accordingly, hot plug insertion according to this embodiment of the invention is a process of inserting an adapter card into a server or other computer system by hot-plugging, under the control of the hot plug controller 303. Hot plug insertion generally entails the following sequence of steps: a) user notification, during which, through a hot-plug administrative application's gui, a technician notifies the server that a hot plug insertion will take place at a particular empty slot, e.g., slot 206; b) power-down, during which, through the hot plug controller 303, the server's operating system turns off the slot, if it is not already in an "off" condition, preferably with a slot-state indicator showing that condition; c) isolation, during which, under the control of the hot plug controller 303, the slot 206 is electrically isolated from the primary PCI bus 202 by the isolation devices 312; c) insertion, during which the adapter card 210 is physically inserted into the slot; d) verification, during which the server 100, through the hot plug controller 303, verifies that the adapter card 210 is inserted properly in the slot 206 by performing diagnostic and performance tests over the secondary PCI bus 306; e) power-up, during which, through the hot plug controller 303, the server's operating system turns on, i.e., powers up, the slot and the newly-inserted adapter card 206, with the slot-state indicator reflecting that condition; g) configuration, during which, the server's operating system re-configures the system by loading a device driver for the newly installed adapter card 210.

Hot plug removal is a process of removing an adapter card from a computer server or other computer system by hot-plugging, under the control of the hot plug controller 303. Hot plug removal generally entails the following sequence of steps: a) preparation, during which, through a hot-plug administrative application's gui, a user indicates that a particular adapter card, e.g., adapter card 210, will removed from a particular slot; b) quiecence, during which, through the administrative application, the server's operating system terminates any on-going processes that are accessing the adapter card 210 and takes the appropriate software driver for the adapter card 210 offline; c) power down, during which, through the hot plug controller 303, the server's operating system cuts power to the slot, with a slot-state indicator showing that the slot 206 is powered down and that it is safe to proceed with removal of the adapter card 210; d) isolation, during which, under the control of the hot plug controller 303, the slot 206 is isolated from the PCI bus signals by isolation devices 312; and e) card removal, during which the adapter card 206 is physically removed from the slot 206.

Figure 4:
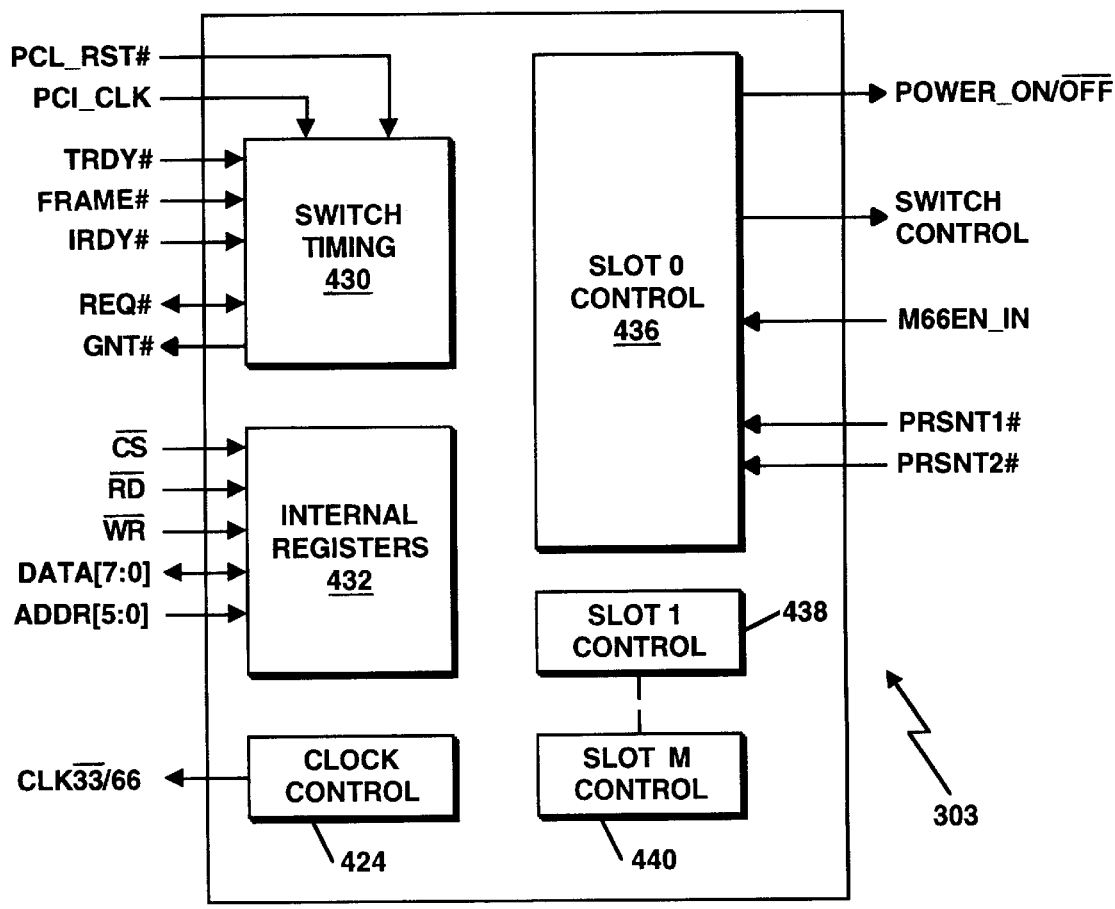
FIG. 4 is a block diagram of an embodiment of the hot plug controller of FIG. 3.

FIG. 4 shows one embodiment of the hot plug controller 303 connected to the primary PCI buses 202. The hot plug controller 303 provides a software interface to sequence power, clocks and bus signals to adapter cards that are being "live" inserted into or removed from slots 206, 208. The hot plug controller 303 includes a switch timing module 430, an internal register module 432 for receiving, e.g., data and address signals, and a clock control module 434 for controlling bus frequency, e.g. a nominal 33 MHz or 66 MHz. The hot plug controller 303 also contains a per-slot control module 436, 438, 440 for each slot that controls the power and slot connection condition (e.g., up to a maximum of "m" slots). Each of these slot control modules 436, 438, 440 is of the same basic construction, so only signal lines for module 436 are shown in more detail.

The hot plug controller 303 contains a PCI interface to the PCI bus 303 for receiving signals from bus lines as specified by the PCI Spec, including (among other conventional lines not shown) the following lines of significance herein: cycle frame (FRAME#), target ready (TRDY#), initiator ready (IRDY#), bus access request (REQ#), bus access grant (GNT#), and address/data lines (AD[31:0]). More specifically, FRAME# is driven by a current bus master to indicate the beginning and duration of an access. FRAME# is asserted to indicate that a bus transaction is beginning. While FRAME# is asserted, data transfer continues. When FRAME# is deasserted, the transaction is in the final data phase. IRDY# indicates the initiating bus master's ability to complete a current data phase of the ongoing transaction. IRDY# is used in conjunction with TRDY#; a data phase is completed on any clock where both IRDY# and TRDY# are asserted. The hot plug controller 303 is reset via a PCI_RST# input. During reset, M66EN inputs from the slots 206, 208 are sampled, and CLK33/66 driven to select an appropriate bus frequency. The switch timing module 430 is used to ascertain a specific bus time slot when the primary PCI bus 303 is available and the slot can be turned "on" or off and thereby connected to or disconnected from the PCI bus 303 by means of the isolation mechanism 310.

To that end, in this embodiment, a combination of the REQ#, GNT#, FRAME#, and IRDY# signals is used to control the timing of slot connection and disconnection. The switch timing module 330 will assert REQ# when the slot is ready for connection or disconnection. It will initiate connection or disconnection when the GNT# is asserted by the host bridge 204, and more particularly when the GNT#, FRAME#, and IRDY# pins are LOW following REQ# being asserted.

Each slot control module 436, 438, 440 is connected to the associated slot by the following signals lines: PWR_ON/OFF, which turns power "on" and "off" to the slot; SWITCH_CONTROL, which causes the isolation mechanism 310 to connect and disconnect the slot; PRSNT2# and PRSNT1#, which indicate the presence or absence of an adapter card in the slot; M66EN, which indicates whether the adapter card in the respective slot can be operated at 66 MHz, and other conventional signal lines (not shown). All of these signal lines are conventional, except as specifically noted herein with respect to the SWITCH_CONTROL signal for certain described embodiments.

Figure 5A:
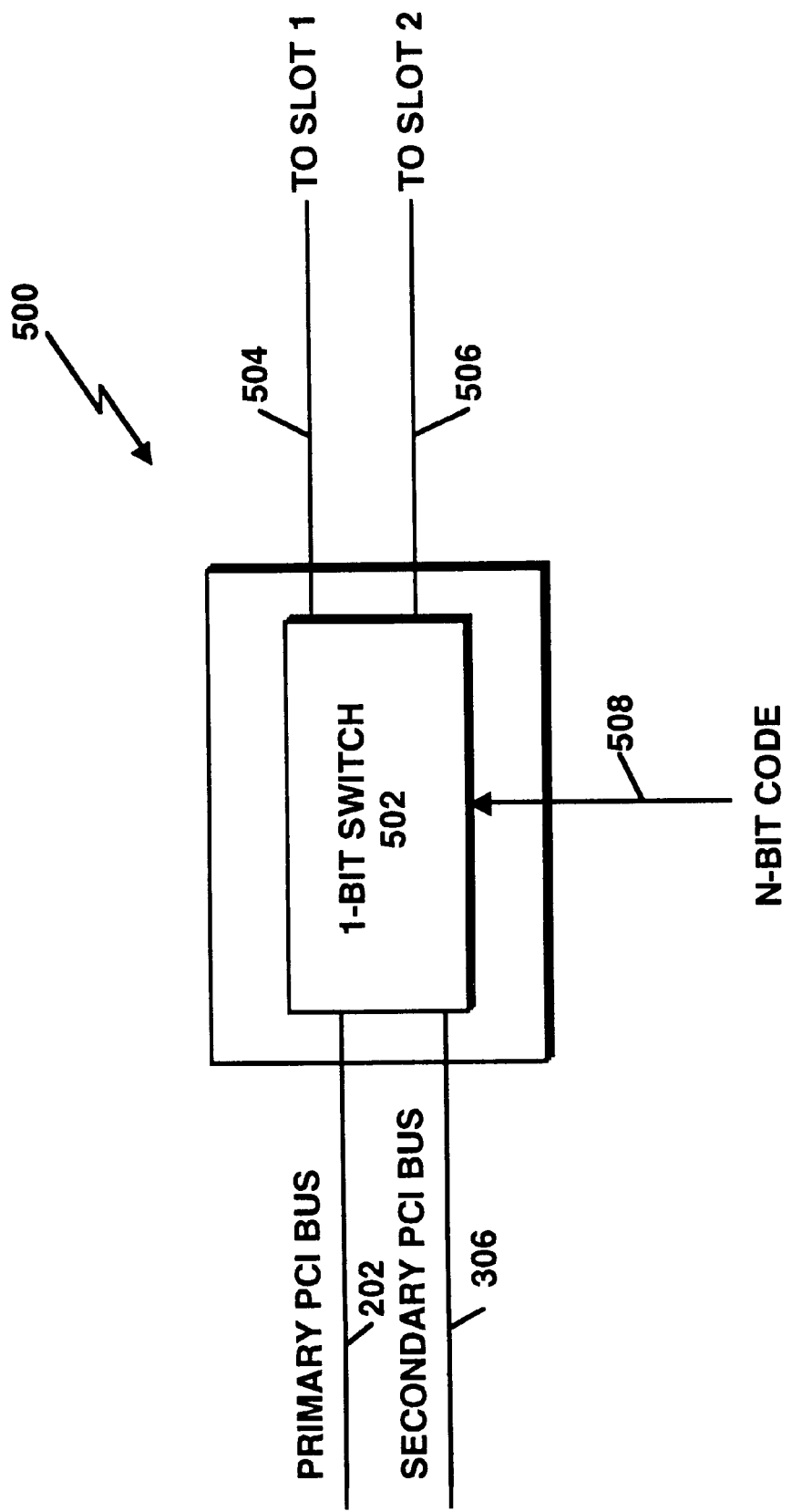
FIG. 5A is a block diagram of an embodiment of the isolation mechanism of FIG. 3.

FIG. 5A shows an isolation mechanism 500 in accordance with an exemplary embodiment for implementing both of the three-way isolation devices 312, 314 of FIG. 3 in a single device supporting the two slots 206, 208. It should be understood that the illustrated two slot arrangement is merely an example, though the number of slots utilized in this embodiment is currently typical for 66 MHz buses. The invention can be implemented in arrangements having more than two slots. The isolation mechanism 500 incorporates a one-bit switch 502 for making the necessary connections. The switch 502 connects one of the primary PCI bus 202 and secondary PCI bus 306 to one of the slots, i.e., slot 1 (corresponding to slot 206 in FIG. 3) and slot 2 (corresponding to slot 208 in FIG. 3), via lines 504 and 506, respectively. Thus, each slot 206, 208 can be connected to only one of the primary and secondary PCI buses 202, 306 at any time. For example, both slots 206, 208 can be connected to the primary PCI bus 202; or both slots 206, 208 can be connected to the secondary PCI bus 306; or slot 206 can be connected to bus 202 and slot 208 to bus 306, or visa versa.

The one-bit switch 502 is controlled by an n-bit code provided over control line 508, which in this embodiment replaces both control lines 316 and 318 of FIG. 3. The n-bit code defines the specific connectivity of the switching device 500, since only certain connections are necessary and appropriate. For example, in FIG. 6, only eight states are required to control the two slots, and thus "n" can equal three (n=3) to optimize the number of pins, or "n" can equal four (n=4) for asynchronous decoding. The switch 502 can be, for example, a commercially available FET switch, or implemented as a custom-designed ASIC (application specific integrated circuit). A switch available from Texas Instruments Incorporated, Texas, USA, designated SN74CBT16209 can be readily adapted for use in this embodiment.

Figure 5B:
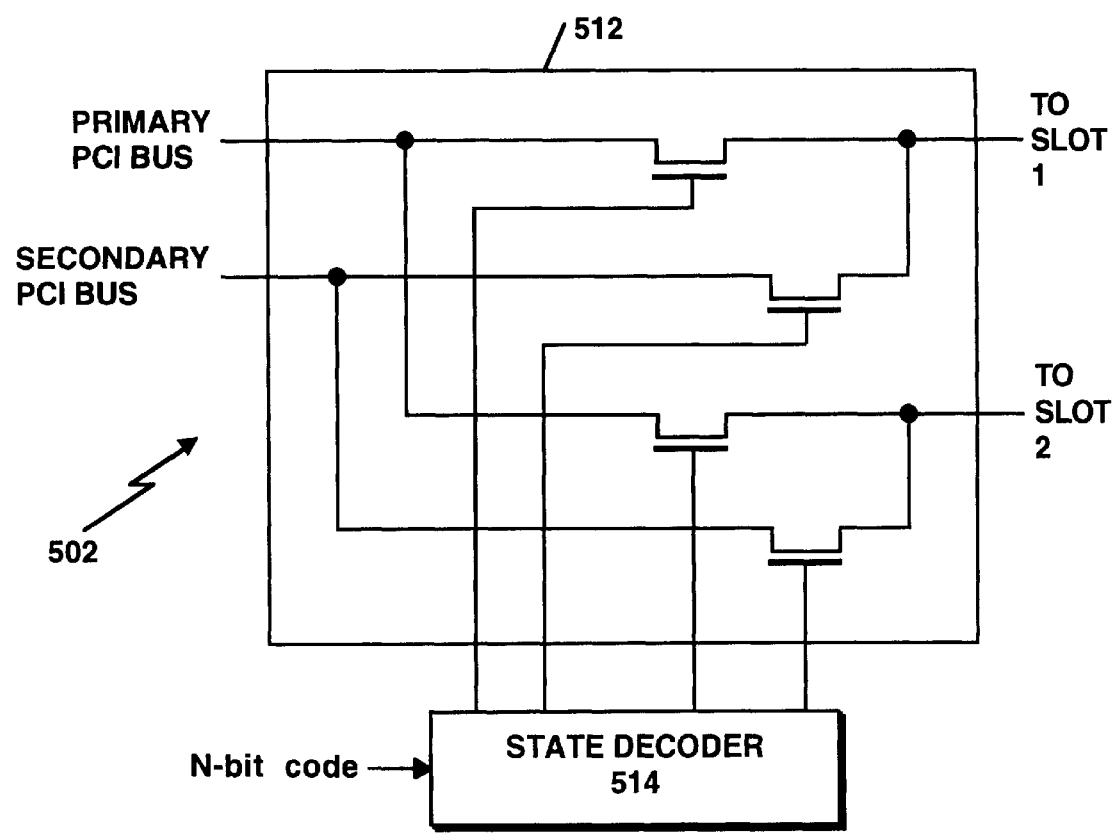
FIG. 5B is a schematic diagram of an implementation of the isolation mechanism of FIG. 5A.

FIG. 5B shows a schematic of an exemplary ASIC implementation of the switch 502 in the form of a crossbar switching fabric 512 under control of a state decoder 514 responsive to an n-bit code. The switching fabric 512 employs a circuit formed using FETs as switching elements for connecting either the primary or secondary PCI bus to either of two slots, designated slot 1 or slot 2. Actually, the hot plug controller 303 can control the switching device 400 through a combination of Grey code, and/or the slot control module 436 (FIG. 4), in order to minimize any bus contention. The state decoder 514 causes the switching fabric 512 to enter into a particular one of the states described below in response to the insertion, removal and testing of an add-in card. In the state names below, "OFF" indicates isolation, "ON" indicated connection, and "TST" indicates testing.

| DESCRIPTION OF STATE TRANSITIONS | | |
|---|---|---|
| State Name | Connection | Description |
| 1OFF_2OFF | None | All busses and slots isolated. |
| 1ON_2ON | Primary PCI-Slot 1 and Primary PCI-Slot 2 | Both slots connected to Primary PCI bus. |
| 1TST_2OFF | Secondary PCI-Slot 1 | Slot 1 accessed for testing; Slot 2 is isolated. |
| 1ON_2OFF | Primary PCI-Slot 1 | Slot 1 connected to Primary PCI Slot 2 is isolated. |
| 1OFF_2TST | Secondary PCI-Slot 2 | Slot 2 accessed for testing; Slot 1 is isolated. |
| 1OFF_2ON | Primary PCI-Slot 2 | Slot 2 connected to Primary PCI; Slot 1 is isolated. |

-continued

DESCRIPTION OF STATE TRANSITIONS

| State Name | Connection | Description |
| --- | --- | --- |
| 1TST_2ON | Secondary PCI-Slot 1 and Primary PCI-Slot 2 | Slot 1 accessed for testing; Slot 2 connected to Primary PCI. |
| 1ON_2TST | Secondary PCI-Slot 2 and Primary PCI-Slot 1 | Slot 2 accessed for testing; Slot 1 connected to Primary PCI. |

Figure 6:
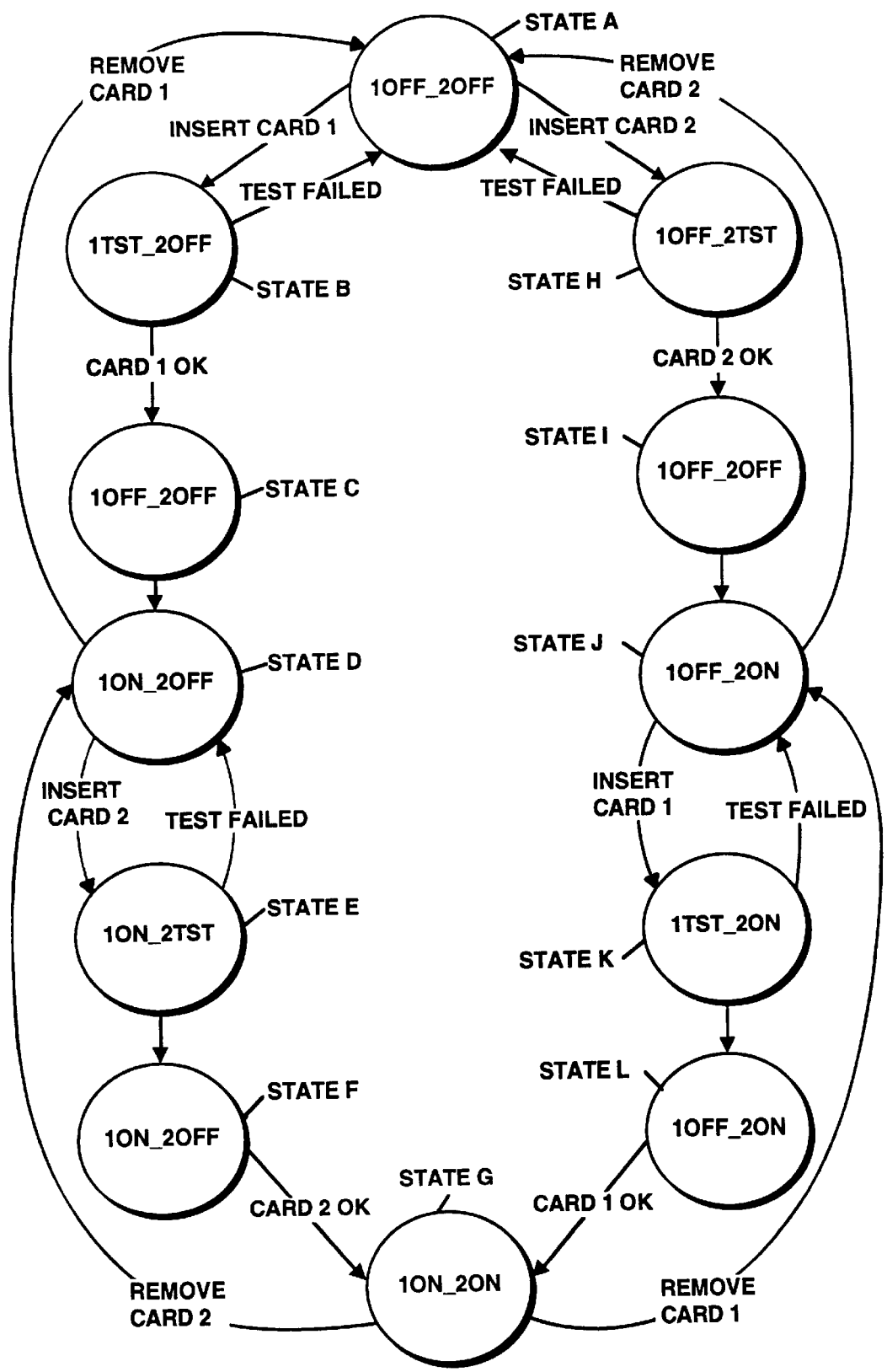
FIG. 6 is an illustrative state transition diagram for operation of the isolation mechanism of FIG. 5A.

FIG. 6 shows a state transition diagram in accordance with a preferred embodiment, illustrating state transitioning of the switch device 502 under the control of the hot plug controller 302 to provide sound operation and avoid switch glitches. Starting at state A at the top of the diagram, with both busses and slots isolated, if a card 1 is inserted into slot 1, the hot plug controller 302 causes the switch to transition to state B. In state B, the card 1 is tested while slot 2 remains off. If the test fails, the hot plug controller 302 causes the switch to return to state A. On the other hand, if card 1 passes, the hot plug controller 302 causes the switch to enter state C, where slot 1 and slot 2 remain isolated, and signals the CPU that card 1 is ready to be connected (or brought on-line). After that, the hot plug controller 302 causes the switch to transition to state D, in which slot 1 is connected and slot 2 remains in an isolated condition. If, while the switch is in state D, card 1 needs to be removed, the hot plug controller 302 causes the switch to transition to state A, and await a further change with respect to insertion or removal of cards in the slots.

If the switch is in state D and a card 2 is inserted in slot 2, the hot plug controller 302 causes the switch to transition to state E. In state E, the card 2 is tested while slot 1 remains ON, i.e., connected. If the test fails, the hot plug controller 302 causes the switch to return to state D. On the other hand, if card 2 passes, the hot plug controller 302 causes the switch to enter state F, where slot 1 is connected and slot 2 remains isolated, and signals the CPU that card 2 is ready to be brought on-line. After that, the hot plug controller 302 causes the switch to transition to state G, in which slot 1 and slot 2 are both connected. If, while the switch is in state G, card 2 needs to be removed, the hot plug controller 302 causes the switch to transition to state D, and await a further change with respect to insertion or removal of cards in the slots.

Starting again at state A at the top of the diagram, with both busses and slots isolated, if a card 2 is inserted into slot 2, the hot plug controller 302 causes the switch to transition to state H. In state H, the card 2 is tested while slot 1 remains off. If the test fails, the hot plug controller 302 causes the switch to return to state A. On the other hand, if card 2 passes, the hot plug controller 302 causes the switch to enter state I, where slot 1 and slot 2 remain isolated, and signals the CPU that card 1 is ready to be brought on-line. After that, the hot plug controller 302 causes the switch to transition to state J, in which slot 2 is connected and slot 1 remains in an isolated condition. If, while the switch is in state J, card 2 needs to be removed, the hot plug controller 302 causes the switch to transition to state A, and await a further change with respect insertion or removal of cards in the slots.

If the switch is in state J and a card 1 is inserted in slot 1, the hot plug controller 302 causes the switch to transition to state K. In state K, the card 1 is tested while slot 2 remains ON, i.e., connected. If the test fails, the hot plug controller 302 causes the switch to return to state J. On the other hand, if card 1 passes, the hot plug controller 302 causes the switch to enter state L, where slot 1 is isolated and slot 2 remains connected, and signals the CPU that card I is ready to be brought on-line. After that, the hot plug controller 302 causes the switch to transition to state G, in which slot 1 and slot 2 are both connected. If, while the switch is in state G, card 2 needs to be removed, the hot plug controller 302 causes the switch to transition to state J, and await a further change with respect to insertion or removal of cards in the slots.

Other Embodiments

As alternative embodiments to that shown in FIGS. 3, a hot plug controller can have any of a number of different bridges for interfacing the primary bridge with the secondary bridge ("X2X", where X is a specified type of bus). For example, where the primary bus is a PCI bus, the invention can be implemented using a "P2X" bridge, such as a PCI-to-JTAG, PCI-to-I2C, or PCI-to-ISA (where "JTAG" stands for IEEE 1149.1 Standard Test Access Port (further described below), "I2C" stands for Inter Integrated Circuit bus, and "ISA" stands for Industry Standard Architecture). The desirability of each of these approaches depends on the application involved; some of these approaches could permit physically smaller implementations, some may limit adapter card testing capability, and some may require more overhead than others.

Figure 7A:
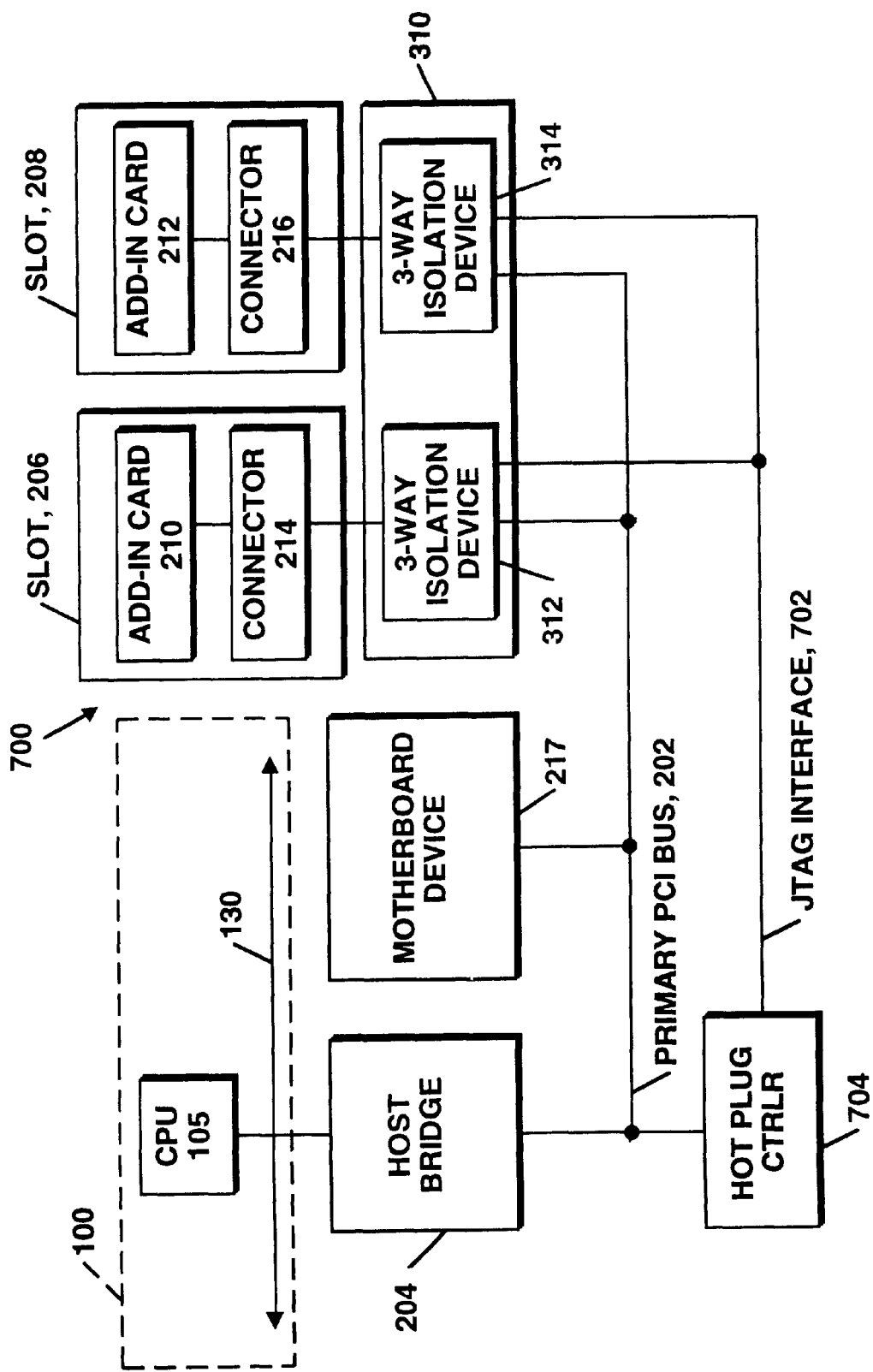
FIG. 7A is a block diagram of an improved hot plug arrangement for the computer system of FIG. 1 in accordance with an alternative JTAG-based embodiment of the invention.

FIG. 7A shows a hot plug arrangement 700 in accordance with an alternative embodiment of the invention, using a JTAG serial interface 702 between the hot plug controller and the isolation devices 312, 314. "JTAG" is further described in IEEE 1149.1—1990, Standard Test Access Port and Boundary-Scan Architecture ("JTAG Spec"), which is incorporated herein by reference, and available from IEEE, 3 Park Avenue, 17$^{th}$ Floor, NY, N.Y., 10016-5997, USA. The circuitry and test logic defined in the JTAG Spec allows test instructions and associated test data to be fed into an adapter card and, subsequently, allows the results of the execution of the instruction to be read out. The hot plug controller 704 in the illustrated JTAG arrangement 700 can decode PCI transactions on the primary PCI bus targeted as 'test' accesses to a particular slot, and then encode the PCI transaction into a serial stream to send to the appropriate isolation devices 312, 314 (for example, implemented as the isolation mechanism 750 of FIG. 7C). The isolation devices 312, 314 would then decode the serial stream back into PCI conventional signals and execute the transaction, clock cycle by clock cycle. Although this approach may be more time consuming and will not test a newly inserted adapter card at full speed, complete functional testing is possible. Hot plug arrangement 700 may be advantageous also in that it lends itself to implementations having minimized controller pin count.

Figure 7B:
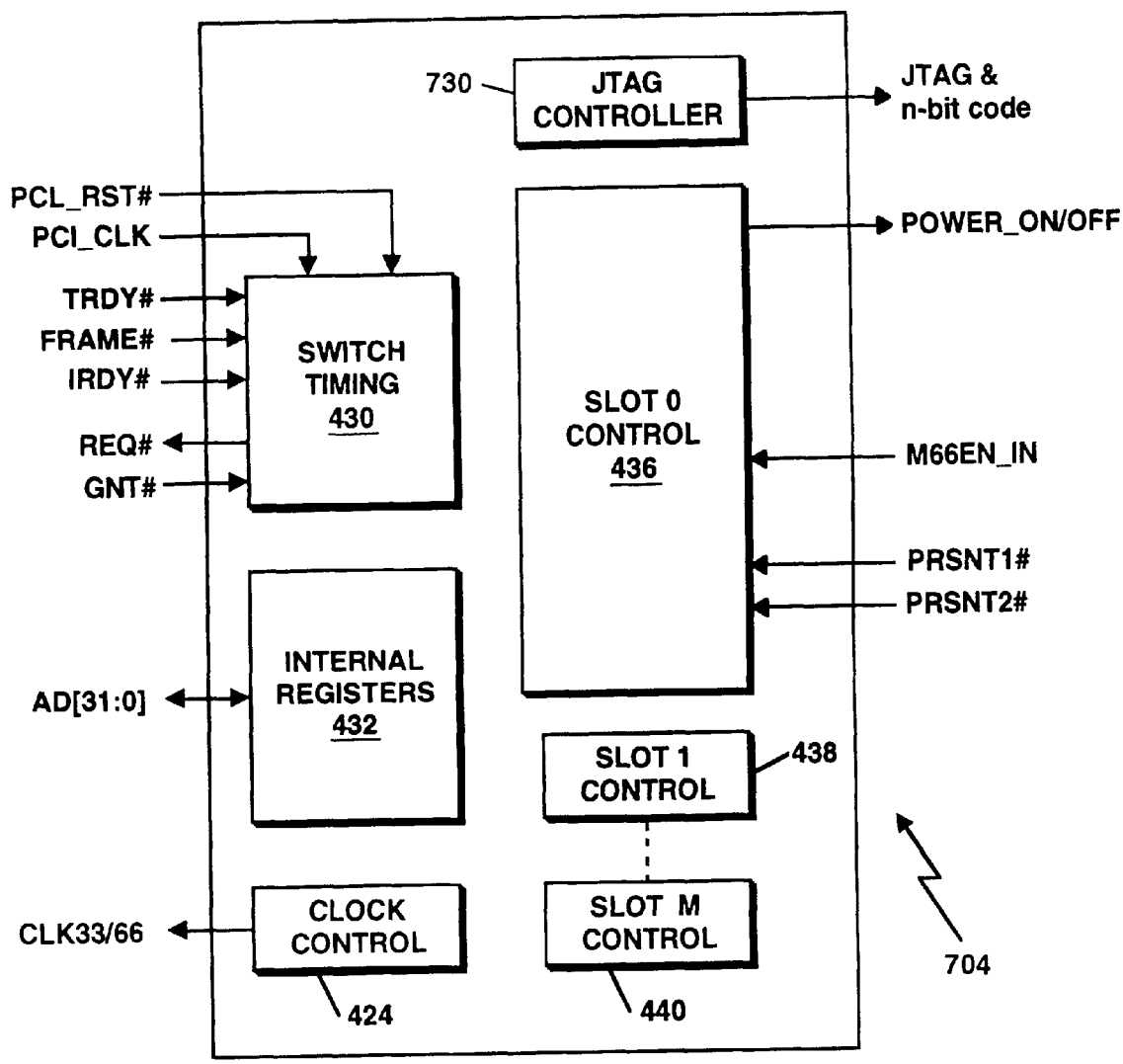
FIG. 7B is a block diagram of an embodiment of the hot plug controller of FIG. 7A.

FIG. 7B shows an illustrative embodiment of the hot plug controller 704 for use in the JTAG-based arrangement 700 of FIG. 7A. The hot plug controller 704 can be essentially the same as FIG. 4, except that it includes a JTAG controller 730 for providing as output a serial stream of commands in accordance with JTAG standard protocols, and a switch control signal, for example, in the form of an n-bit code, as described above.

Figure 7C:
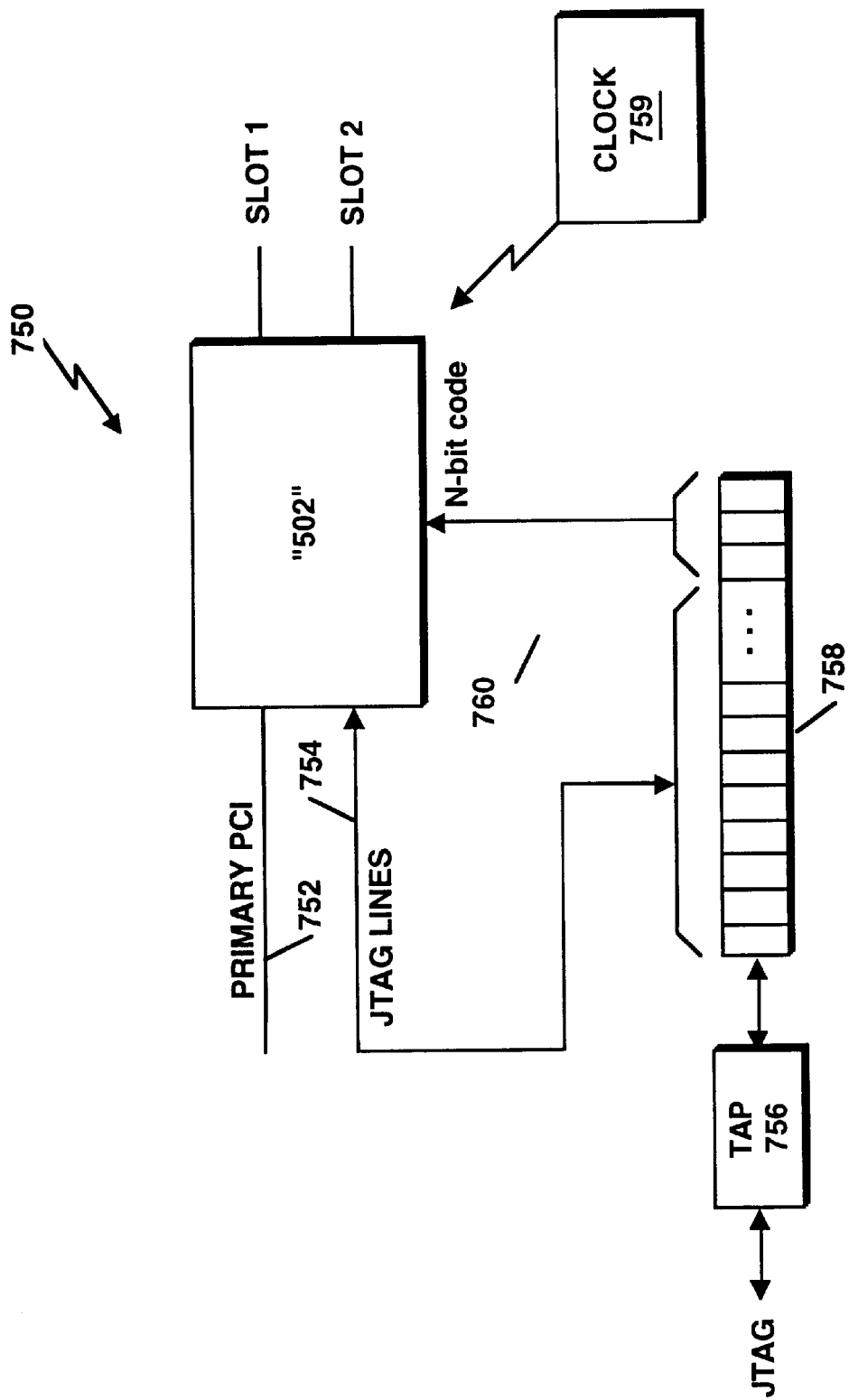
FIG. 7C is a block diagram of an embodiment of the isolation mechanism of FIG. 7A.

FIG. 7C shows a three-way isolation mechanism 750 for use in the JTAG-based arrangement 700 of FIG. 7A. The switch 502 is controlled by an n-bit code, as noted above, for selectively interconnecting the primary PCI bus 752 or JTAG test lines 754 to either slot 1 or slot 2. A test access port ("TAP") 756 decodes a serial stream input of commands from the JTAG controller 730 (FIG. 7B), including the n-bit code. The TAP 756 loads the decoded results into a register 758. The register 758 will thus contain a test bit pattern, which is applied during a single clock cycle of clock 759 to a JTAG test lines 754 connected as input to the switch 502, and via the switch to selected contacts of a newly inserted adapter card (not shown) received in either slot 1 or slot 2. The register 758 will also contain and then apply the n-bit code to a control terminal 760 of the switch 502 during the same clock cycle. The results of the test are returned via the switch 502 responsive to another n-bit code, through JTAG lines 756 and placed in the register 758 and then passed to the JTAG controller 730 via the TAP 752.

Figure 8A:
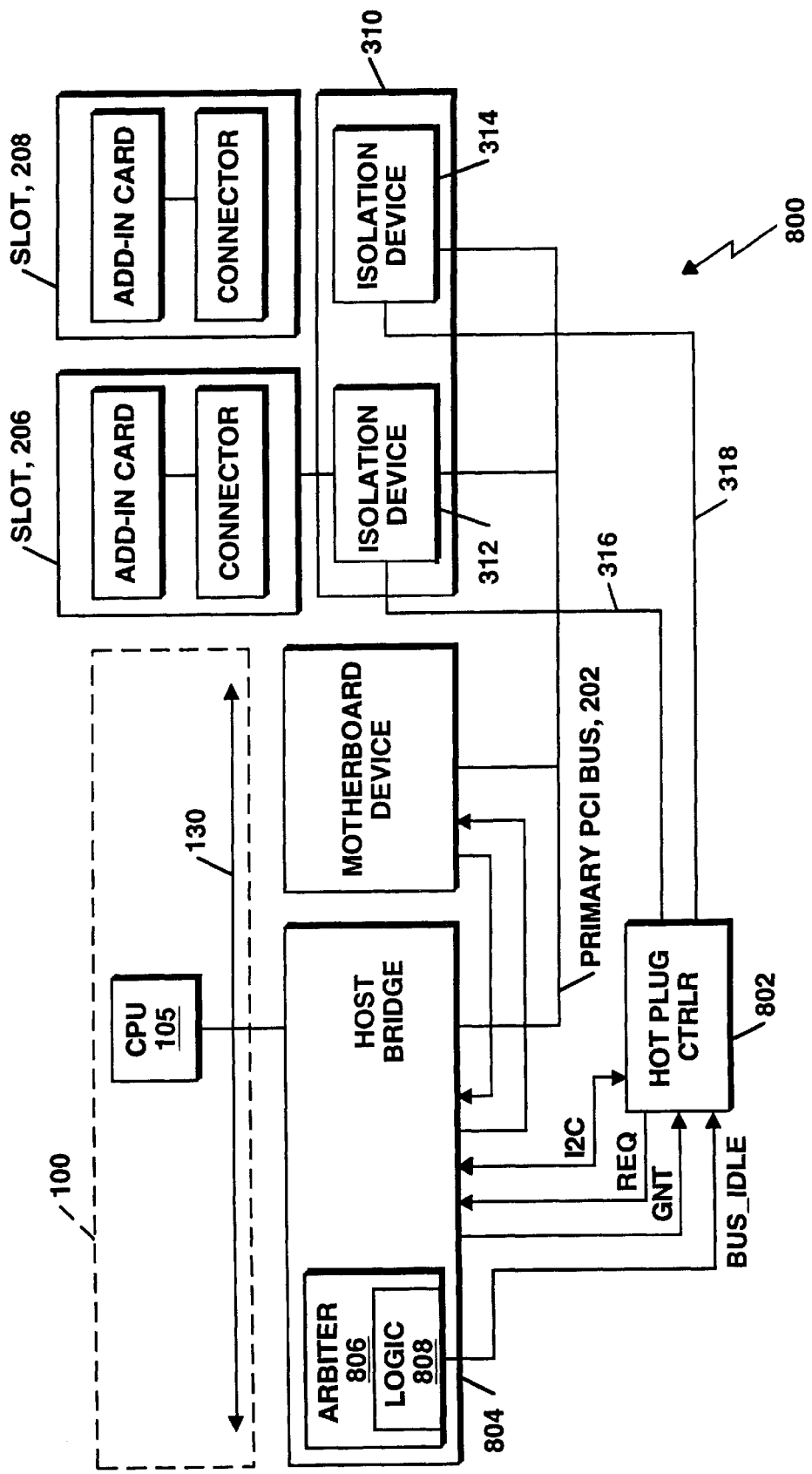
FIG. 8A is a block diagram of an improved hot plug arrangement for the computer system of FIG. 1 in accordance with yet another alternative embodiment of the invention.

FIG. 8A shows a hot plug arrangement 800 in accordance with yet another alternative embodiment of the invention. The hot plug arrangement 800 has a hot plug controller 802, which is connected to a host bridge 804 by a pair of request (REQ) and grant (GNT) lines constituting arbitration lines for the primary PCI bus 202, in the same manner as any other PCI device. An I2C bus (I2C) connects the host bridge 804 to the hot plug controller 802 for configuring and controlling the hot plug controller 802. Preferably, the hot plug controller 802 is not otherwise connected to the primary PCI bus lines; however, the hot plug controller 802 also communicates with the host bridge 804 through a special port into the PCI arbiter 806, via a special signal line, BUS_IDLE. The BUS_IDLE signal is generated, for example, by combinational logic 808 in the host controller 804, and is asserted when the primary PCI bus 302 is idle (i.e., no bus transaction), which occurs when both FRAME# and IRDY# are HIGH. In this embodiment, under software control, the hot plug controller 802 performs the following steps in enabling of the isolation devices 312, 314:

A) assert REQ# to the host bridge, requesting control of the PCI bus;

B) wait for the host bridge to assert GNT#, indicating that the HPC is the next master allowed use of the PCI bus;

C) wait for the BUS_IDLE to be asserted by the host bridge, indicating that the previous master has relinquished the PCI bus, that no other master will be allowed onto the PCI bus, and that this condition will continue for a pre-determined number (e.g., 16) of clock cycles. During the 16 clock cycles, the hot plug controller will enable the isolation devices and de-assert REQ#.

As described, this implementation can avoid placing additional loading on any of the shared signals of the PCI bus, such as FRAME# and IRDY#, while providing hot plugging capability. The overhead for this arrangement amounts to only an additional BUS_IDLE pin off the host bridge 804, and a simple logic circuit for generating the BUS_IDLE signal. Further, since the interface to the host bridge 804 is through dedicated point-to-point signals, the host plug controller 802 and the host bridge 804 can be placed at a relatively long distance apart, allowing system designs with separate input/output (I/O) boards.

Figure 8B:
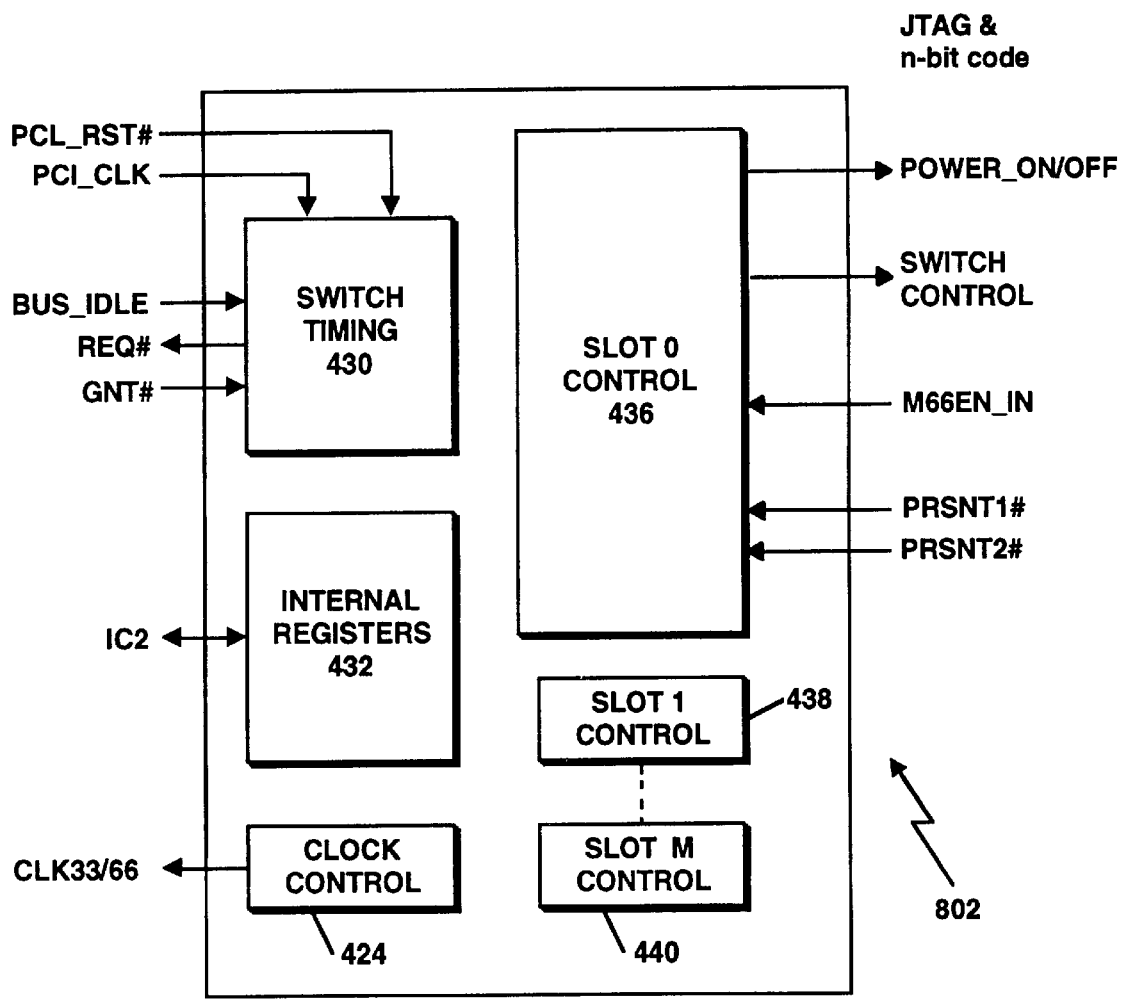
FIG. 8B is a block diagram of an embodiment of the hot plug controller of FIG. 8A.

FIG. 8B shows an illustrative embodiment of the hot plug controller 802 for use in the hot plug arrangement 800 of FIG. 8A. The hot plug controller 802 can be essentially the same as FIG. 4, except that it includes a BUS_IDLE input to the switch timing module 430, and an I2C bus input to the internal registers 432 instead of the AD [31:0} input lines.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same or equivalent functions may be suitably substituted. Further, various techniques of the invention may be achieved in either all software implementations, using appropriate processor instructions, or in all hardware logic implementations, or in hybrid implementations that utilize a combination of hardware logic and software logic to achieve the same or equivalent results. Further, aspects such as specific configuration of logic and/or instructions utilized to achieve a particular function, as well as other modifications to the inventive concept are intended to be covered by the appended claims.

What is claimed is:

1. A bus arrangement for a computer system adapted for off-line testing of electrical operation of electronic components connectable to a first bus, the bus arrangement comprising:

A) a first and a second bus;

B) a plurality of slots, each said slot having a connector for making electrical connection with an electronic component receivable by the slot;

C) a bridge for connecting the first bus to the second bus; and

D) an isolation device, responsive to a control signal, for selectively (i) connecting at least one of the slots with the first bus during operation of the electronic component connected therewith, and (ii) disconnecting the one slot from the first bus and connecting the one slot with the second bus during testing of the electronic component therewith.

2. The bus arrangement in accordance with claim 1, further comprising a test controller for generating the control signal to cause at least one of the slots to be connected to the second bus for testing of the electronic component connected therewith, and to cause the at least one slot to be connected with the first bus after testing of the electronic component.

3. The bus arrangement in accordance with claim 1, further comprising a host bridge for connecting a system bus of the computer system to the first bus.

4. The bus arrangement in accordance with claim 2, wherein the isolation device comprises a plurality of switches.

5. The bus arrangement in accordance with claim 4, wherein a first of the switches can connect a first line of a first of the slots to a corresponding line of either the first or the second bus.

6. The bus arrangement in accordance with claim 4, wherein a first of the switches can connect a first line of more than one of the slots to either the first or second bus.

7. The bus arrangement in accordance with claim 4, wherein the first bus comprises an input/output bus.

8. The bus arrangement in accordance with claim 7, wherein the first and second buses each comprise a PCI bus.

9. A method for off-line testing of electrical operation of electronic components connectable to a first bus of a computer system, the first bus including a plurality of slots, each said slot having a connector for making electrical connection with an electronic component receivable with the slot, the method comprising:

A) selectively connecting, responsive to a first control signal, at least one of the slots with the first bus during operation of the electronic component connected therewith; and B) selectively disconnecting, responsive to a second control signal, the one slot from the first bust bus and connecting, responsive to the second control signal, the one slot with a second bus during testing of the electronic component connected therewith.

10. The method in accordance with claim 9, further comprising applying the control signals so as to cause at least one of the slots to be connected to the second bus for testing of the electronic component connected therewith, and to cause the at least one slot to be connected with the first bus after testing of the electronic component.

11. The method in accordance with claim 10, further comprising a host bridge connecting a system bus of the computer system to the first bus, and a controller controlling the connection of the slots and the first and second buses, the controller being connected with the host bridge and the slots for applying the control signals to the slots in response to the host bridge.

12. The method in accordance with claim 9, wherein the first bus comprises an inpuvoutput bus.

13. The method in accordance with claim 9, wherein the first and second buses each comprise a PCI bus.

14. The method in accordance with claim 10, further comprising switching a plurality of switches connected to the slots and the first and second buses so as to selectively connect at least one of the slots to one of the first and second buses.

15. The method in accordance with claim 14, further comprising a first of the switches connecting a first line of a first of the slots to a corresponding line of either the first or the second bus.

16. The method in accordance with claim 14, further comprising a first of the switches connecting a first line of more than one of the slots to either the first or second bus.

17. A method for off-line testing of electrical operation of electronic components connectable to a first bus of a computer system, the first bus including a plurality of slots, each said slot having a connector for making electrical connection with an electronic component receivable with the slot, the method comprising:

A) selectively connecting, responsive to a control signal, at least one of the slots with the first bus during operation of the electronic component connected therewith;

B) selectively connecting, responsive to a control signal, at least one of the slots with a second bus during testing of the electronic component connected therewith;

C) applying the control signals so as to cause at least one of the slots to be connected to the second bus for testing of the electronic component connected therewith, and to cause the at least one slot to be connected with the first bus after testing of the electronic component;

D) connecting a system bus of the computer system to the first bus with a host bridge and controlling the connection of the slots and the first and second buses with a controller, the controller being connected with the host bridge and the slots for applying the control signals to the slots in response to the host bridge; and E) ascertaining whether the first bus is idle prior to connecting a slot thereto, the controller gaining control of the first bus, the host bridge providing the controller with a signal so as to indicate when the first bus is idle, and the controller causing the at least one slot to be connected to the first bus in response to the signal.

18. A computersystem comprising:

A) a system bus;

B) a plurality of system components, including a central processing unit and a memory, electrically connected to the system bus;

C) a primary peripheral bus and a secondary peripheral bus;

D) a host bridge for electrically connecting the system bus to the primary peripheral bus for passing data between the system bus and the primary peripheral bus;

E) a number of multi-way switches;

F) a number of adapter card slots each having a connector for electrically connecting an adapter card to the multi-way switches; and G) a hot plug controller for electrically connecting the primary peripheral bus to the secondary peripheral bus for passing data between the primary and secondary buses, and for controlling the operation of the multi-way switches so as to selectively connect an individual adapter card via a connector to the primary peripheral bus during operation of the adapter card and to disconnect the adapter card from the primary peripheral bus and to connect the adapter card to the secondary peripheral during testing of the adapter card.

* * * * *

UNITED STATES PATENT AND TRADEMARK OFFICE
CERTIFICATE OF CORRECTION

PATENT NO.    : 6,363,452 B1
DATED         : March 26, 2002
INVENTOR(S)   : Jorge E. Lach It is certified that error appears in the above-identified patent and that said Letters Patent is hereby corrected as shown below:

Column 12,
Line 31, replace "component therewith" with -- component connected therewith --;
Line 67, delete "bust";

Column 13,
Line 18, replace "an inpuvoutput bus" with -- an input/output bus --; and Column 14
Line 44, replace "peripheral during testing" with -- peripheral bus during testing --.

Signed and Sealed this

Sixteenth Day of July, 2002

Attest:

JAMES E. ROGAN
Attesting Officer         Director of the United States Patent and Trademark Office